UNITED STATES PATENT OFFICE.

JOHN B. DEEDS, OF TERRE HAUTE, INDIANA, ASSIGNOR TO ROBERT H. CATLIN, OF SAME PLACE.

ASBESTUS PACKING.

SPECIFICATION forming part of Letters Patent No. 400,755, dated April 2, 1889.

Application filed March 23, 1888. Serial No. 268,284. (No specimens.)

*To all whom it may concern:*

Be it known that I, JOHN B. DEEDS, a citizen of the United States, residing at Terre Haute, Vigo county, Indiana, have invented new and useful Improvements in Asbestus Packing, of which the following is a specification.

The object of the invention is to render asbestus or mineral wool of a nature or character by which the same may be readily spun, twisted, or plaited into various forms—such, for instance, in lengths, as in the manner of a rope or into the form of packing for joints, stuffing-boxes, and the like—the said material after treatment having, in addition to the qualities afforded by itself naturally, the characteristics incident to the forms into which it may be put, and that also given it by the material with which it is intermingled or mixed.

In carrying my invention into effect I take any given quantity of asbestus or mineral wool (which must be in threads as long as can be had) and thoroughly mix or intermingle therewith plumbago or black-lead, any suitable oil, and preferably a little rosin to give increased body. These materials—that is to say, the plumbago or black-lead, the oil, and rosin—are made up to the consistency of a thin paste, the nature of the rosin rendering it necessary that the paste be hot at time of treatment.

Various methods could be resorted to in the practice of the invention; and, as an instance, I would say that I have found it preferable to resort to the use of an air-tight box or vessel, into which the combined mass is placed and then subjected to the action of heat. The heat causes the paste to spread through and cover the entire surface of the asbestus, while the qualities possessed by the paste are partially absorbed by the asbestus, thus rendering it fit for the several purposes mentioned.

I resort to no particular proportions in the practice of my invention, as such is regulated entirely in accordance with judgment of the mind.

After the treatment above set forth the material may be readily twisted, spun, or plaited into lengths or other forms; and I have found the material admirably adapted as a wrapping for joints and also as a packing for stuffing-boxes and analogous uses.

I lay no claim herein to the method of producing the present invention, as that forms the subject-matter of another application filed on the 13th day of December, 1888, and having Serial No. 293,435.

Having thus described my invention, what I claim as new, and desire to secure by Letters Patent, is—

In an article for packing, strips or lengths of asbestus or mineral wool when twisted, spun, or plaited into shape, and having incorporated therewith a paste composed of plumbago or described equivalent, oil, and rosin, substantially as described.

In testimony whereof I have hereunto set my hand in the presence of two subscribing witnesses.

JOHN B. DEEDS.

Witnesses:
LEWIS S. CALDER,
WILLIAM DIDRICH.